Aug. 19, 1958 R. STANPHILL 2,848,687
CIRCUIT FOR SELECTING BOTH UPPER AND LOWER SIDEBANDS
Filed April 12, 1956
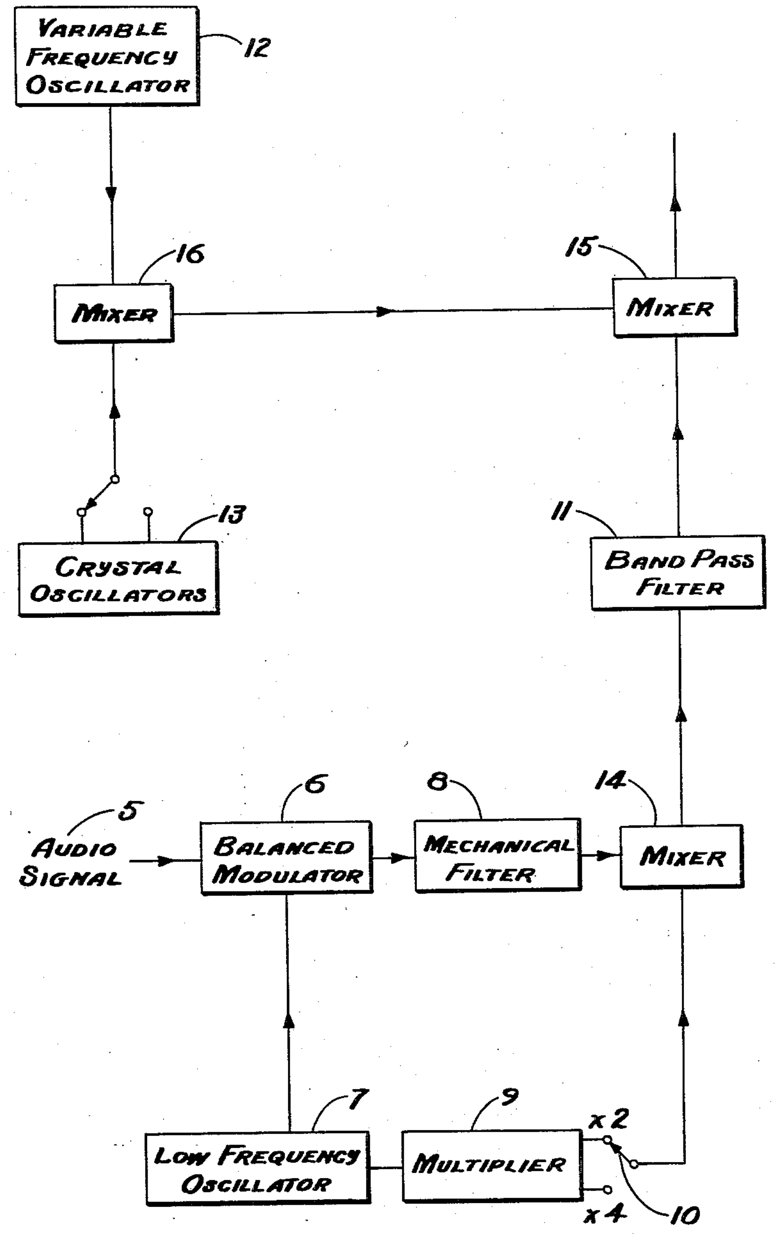
INVENTOR.
RAY STANPHILL
BY Mosely and Harsha
ATTORNEYS United States Patent Office 2,848,687
Patented Aug. 19, 1958

2,848,687

CIRCUIT FOR SELECTING BOTH UPPER AND LOWER SIDEBANDS

Ray Stanphill, Irving, Tex., assignor to Collins Radio Company, Cedar Rapids, Iowa, a corporation of Iowa Application April 12, 1956, Serial No. 577,796

1 Claim. (Cl. 332—45)

This invention relates to single sideband transmission systems and more particularly to a system for selecting a desired one of two sidebands.

In carrier wave transmission systems where the carrier wave is modulated to produce upper and lower sidebands on opposite sides of the carrier frequency, it is desirable to be able to select one sideband for transmission while rejecting the other sideband. However, for maximum performance the rejected sideband should be relatively close to the desired sideband in frequency to reduce the cost of filters and other equipment. Priorly it has been the practice, where one of two sidebands is desired for transmission, to generate both sidebands and filter out the rejected sideband. This requires two filters or a variable filter if selection of sidebands is desired. This invention provides a system for selecting either sideband individually without filter changes. Thus, one of the sidebands which it is desired to generate may be selected and the other sideband will be filtered with the same filters. It is possible with this invention to use components which possess fixed frequency characteristics while generating either sideband. The fixed frequency characteristics permit the components to have maximum gain and/or suppression built into the elements. The fixed characteristics of the components also result in the economical construction of this system.

It is an object of this invention to provide a single sideband transmission system whereby either the upper or lower sideband may be selected by a switch and generated without changing the filters or other components to reject the other and unwanted sideband. It is a further object of this invention to provide a single sideband selection system where either the upper or lower sideband may be selected for transmission without changing the frequency characteristics of the components. It is a still further object of this invention to provide a single sideband selection system where the components, especially the filters, are less costly and yet have the system provide better separation of the generated frequencies.

These and other objects of this invention will become apparent when the following description is read in conjunction with the accompanying drawing, in which the single figure shows a block diagram of one embodiment of this invention. It is to be noted that the blocks in the drawing are connected by single lines and that in actual practice at least two lines would be required between each of the blocks.

Referring now to the drawing, an audio frequency signal is generated by a generator 5 and fed into a balanced modulator 6. This signal may be a single frequency or have a number of frequencies included therein, such as if there is a voice signal generated. The signal from generator 5 may be amplified if necessary before feeding into the balanced modulator 6. A low frequency oscillator 7 generates a low frequency signal having a fixed frequency. This low frequency signal is applied to the balanced modulator 6 with the audio frequency signal. The output of the balanced modulator is applied to a mechanical filter 8 which is so designed that it will pass only the sum of the frequencies which are applied to the balanced modulator 6. Simultaneously, the low frequency oscillator is also sending an output signal to a multiplier 9. Multiplier 9 is so designed that it may either double or quadruple the frequency of the signal from the low frequency oscillator. The output of the multiplier is connected to a switch element 10 which provides a selection for either the double or quadruple of the frequency of the low frequency oscillator. Whichever frequency is selected by the switch element 10 is then applied to a mixer 14 with the output of the mechanical filter 8. The mixer tube 14 will produce sum and difference frequencies from these applied frequencies. The output of the mixer tube 14 is fed to a bandpass filter 11 which has a center frequency equal to a frequency which is three times the frequency of the low frequency oscillator. The frequency passed by the bandpass filter will be either the upper or lower sideband and is applied to mixer 15. Also applied to the mixer 15 is a high frequency signal which is variable and is produced by the combination of a signal from the variable frequency oscillator 12 and the crystal oscillator 13 in mixer 16. The high frequency output signal from the mixer 16 is applied to mixer 15 with the sideband passed through the bandpass filter 11. The output from the mixer 15 may be applied to amplifiers and eventually transmitted by any well-known system.

A specific example of this invention which has been constructed used an audio frequency signal of 1000 cycles and a low frequency oscillator signal of 250 kilocycles. These signals were combined in the balanced modulators and the mechanical filter to produce a signal of 251 kilocycles applied to the mixer. With the switch 10 set on the double frequency position, a frequency of 500 kilocycles was also applied to the mixer. The mixer then had an output of 751 kilocycles, which is the sum of the frequencies applied, and an output of 249 kilocycles, which is the difference of the frequencies applied to the mixer. These signals were applied to the bandpass filter which was set with a middle frequency of 750 kilocycles, three times the value of the low frequency oscillator. The filter will pass only the 751 kilocycle signal which is the upper sideband.

To generate the lower sideband, the switch was placed at the quadruple frequency position and the 251 kilocycle signal was applied to the mixer as described before, but instead of 500 kilocycles, we now had 1000 kilocycles also applied to the mixer. The output of the mixer is then 1251 kilocycles, the sum of the frequencies applied thereto, and 749 kilocycles, the difference of the frequencies applied. These signals are also applied to the bandpass filter 11 and only the 749 kilocycle signal will pass. This is then the lower sideband. The outputs from the bandpass filter are applied to the high frequency signal in mixer 15 and the transmitted signal is always dependent upon the sidebands generated and added to the high frequency signal.

It is seen that both the upper and lower sidebands may be generated with no change in any of the components as to frequency or operating characteristics. The only change has been to move the switch 10 from the double to the quadruple position and in so doing select for generation either the upper or lower sideband. The intelligence and the bandwidth of the sideband are determined by the nature of the audio signal. The filters necessary in this invention are economical and are designed to operate at their most efficient point due to the small frequency separation between the sidebands.

Although this invention has been described with respect to a particular embodiment thereof, it is not to be so limited, as changes and modifications may be made therein which are within the full intended scope of the invention as defined by the appended claim.

I claim:

A single sideband transmission system including a source of audio signals, a source of low frequency signals, said low frequency signals having a frequency F1, a balanced modulator, said modulator combining said audio signals with said low frequency signals, means for selecting a predetermined output frequency from said modulator, a multiplying means, said multiplying means capable of producing a plurality of output frequencies from a single input frequency, certain of said output frequencies being related by a factor of two, said multiplying means connected to said source of low frequency signals whereby the output signals from said multiplying means are said low frequency signals multiplied a predetermined number of times, means for selecting the desired multiplier of said low frequency signals, a first mixer, the output signals from said multiplying means and said means for selecting a predetermined output frequency from said modulator means connected to said first mixer, filter means for filtering the output frequency from said first mixer, the output frequency from said filter being a predetermined number of times larger than said low frequency signal, means for producing a high frequency signal including a variable frequency oscillator, a crystal oscillator, and a second mixing means, a third mixer, said third mixer combining the high frequency signal with the output of said first mixer whereby a desired one of the sidebands in a single sideband system is produced, said desired sideband being selected by the value of said multiplier.

References Cited in the file of this patent

UNITED STATES PATENTS

| | | |
|---|---|---|
| 2,246,184 | Peterson | June 17, 1941 |

FOREIGN PATENTS

| | | |
|---|---|---|
| 912,213 | France | Apr. 23, 1946 |